United States Patent [19]

Beckwith

[11] 4,369,598

[45] Jan. 25, 1983

[54] CONTAINER ELEMENT COMBINATION FOR SEED SPROUTING OR PLANT CULTURE

[76] Inventor: Thomas F. Beckwith, 223-14th Ave. East, Apt. 1, Seattle, Wash. 98112

[21] Appl. No.: 245,327

[22] Filed: Mar. 19, 1981

[51] Int. Cl.³ ............................................. A01G 9/02
[52] U.S. Cl. ..................................... 47/66; 29/401.1; 29/416; 47/81; 220/4 D
[58] Field of Search ................... 47/66, 73, 74, 81, 82, 47/83, 84, 58, 14; 220/4 D, 287, 4 C, 70, 72, 74, 200, 353, 355, 356; 206/508; 29/401.1, 416

[56] References Cited

U.S. PATENT DOCUMENTS

| | | | |
|---|---|---|---|
| D. 220,973 | 6/1971 | Yates | D49/29 |
| 1,557,712 | 10/1925 | Little | 47/66 |
| 2,594,307 | 4/1952 | Valenzuela | 47/37 |
| 2,859,558 | 9/1958 | Hallum | 47/37 |
| 2,893,167 | 7/1959 | Davidson | 47/37 |
| 2,960,799 | 11/1960 | Schneider | 47/37 |
| 3,162,981 | 12/1964 | Miller | 47/74 |
| 3,259,263 | 7/1966 | Wei | 220/4 D |
| 3,298,133 | 1/1967 | Courtright | 47/81 X |
| 3,374,574 | 3/1968 | Haile | 47/83 |
| 3,471,192 | 10/1969 | Childs et al. | 294/50.7 |
| 3,474,928 | 10/1969 | Hurtt | 220/60 |
| 3,515,306 | 6/1970 | Roper et al. | 220/60 |
| 3,516,571 | 6/1970 | Roper et al. | 220/60 |
| 3,631,627 | 1/1972 | Van Zijerden | 47/34 |
| 3,655,089 | 4/1972 | Tower | 220/287 |
| 3,956,178 | 5/1976 | Mason | 206/508 |
| 3,961,443 | 6/1976 | Insalaco | 47/66 X |
| 3,973,316 | 8/1976 | Maher | 29/416 |
| 4,006,557 | 2/1977 | Sawyer | 47/14 X |
| 4,016,678 | 4/1977 | Larsen | 47/84 X |
| 4,019,279 | 4/1977 | Moorman et al. | 47/25 |
| 4,047,329 | 9/1977 | Holt | 47/74 X |
| 4,115,950 | 9/1978 | Lantai | 47/58 |
| 4,145,841 | 3/1979 | Woolpert | 47/66 |

FOREIGN PATENT DOCUMENTS 1053677  1/1967  United Kingdom ................. 29/416

Primary Examiner—James R. Feyrer
Attorney, Agent, or Firm—David H. Deits; Gregory W. Moravan

[57] ABSTRACT

A multiple use container is made by modifications to a tapered wall, plastic, utility bucket and its associated lid. The parts may alternatively be specifically manufactured for the container. The utility bucket from which the container is made is of the type having reinforcing ribs about its upper sidewall. The bucket lid has a groove on its upper surface and a pair of concentric grooves on its lower surface. The bucket is cut along two horizontal lines to form a ring structure which may be split; an open top container; and a reinforcing ring which is inverted and placed around the upper edge of the open top container. The bucket lid is inverted with the upper edge of the open top container received in the single groove on what was the top of the bucket lid. Holes are placed in the lid. The ring structure is inverted and its rim is inserted in the outer concentric groove of the lid. An identical lid is placed on top of the inverted ring structure with the top edge of the ring structure received in the inner concentric groove of the upper lid. Webs on opposite sides of the bucket have holes in them which are used for receiving the ends of U-shaped clips to hold a series of stacked ring structures together.

13 Claims, 14 Drawing Figures

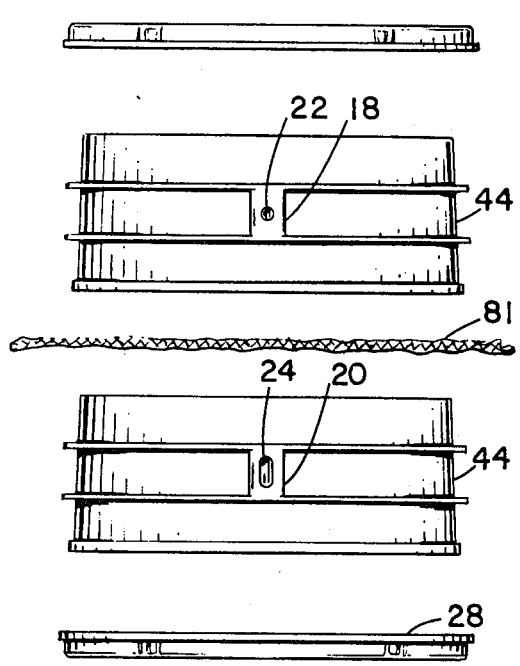
FIG. 12
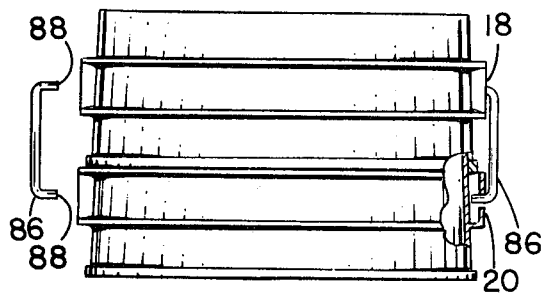
FIG. 10
FIG. 13
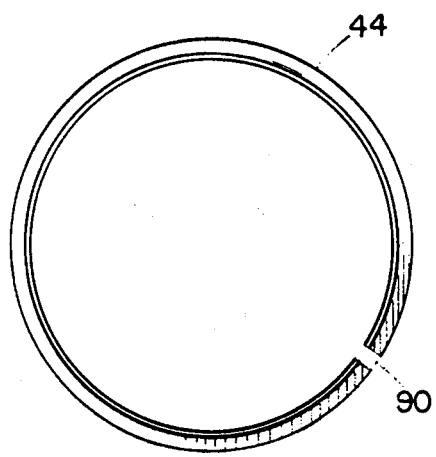
FIG. 11
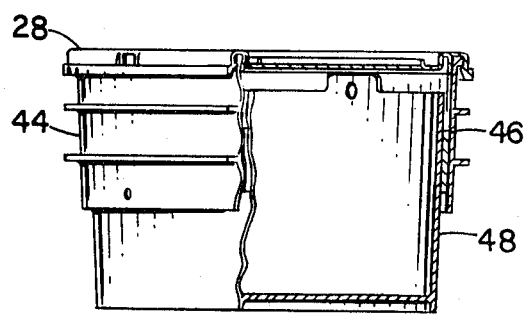
FIG. 14

CONTAINER ELEMENT COMBINATION FOR SEED SPROUTING OR PLANT CULTURE

SUMMARY OF THE INVENTION

The invention is a multiple use container which is particularly suited for use in the cultivation of plants. The container may be made by modifications to a tapered wall, plastic, utility bucket and its associated lid. The parts may alternatively be specifically manufactured for the container. The utility bucket from which the container is preferably made is of the type having reinforcing ribs about its upper sidewall. The bucket lid has a groove on its upper surface and a pair of concentric grooves on its lower surface. To form the utility container, the bucket is cut along two horizontal lines to form three segments. The uppermost segment forms a ring structure which may be stacked with identical ring structures. The ring structures may be split so that they are insertable laterally around the stem of a plant. The lowest portion forms an open top container which may serve as a water reservoir. The central portion forms a reinforcing ring which is inverted and placed around the upper edge of the open top container. The bucket lid is inverted with the upper edge of the open top container received in the single groove on what was the top of the bucket lid. Drain holes are placed in the lid to permit water to pass through it and for the insertion of wicks. The ring structure is inverted and its rim is inserted in the outer concentric groove of the same lid. An identical lid is placed on top of the now inverted ring structure with the top edge received in the inner concentric groove of the upper lid. A mesh material may be inserted between a series of adjacent, stacked ring structures so that the container may be used as a seed sprouter. Webs on opposite sides of the bucket which are positioned between the reinforcing ribs have holes in them which are normally used for receiving the ends of the bucket handle. U-shaped clips are inserted in these holes in the webs to hold stacked ring structures together. Openings may be provided in the upper lid to permit it to be used as a moisture retention barrier.

BRIEF DESCRIPTION OF THE DRAWINGS

FIG. 10 is an exploded, partial, side elevation view of the multiple use container illustrating how mesh may be inserted between ring structure elements.

FIG. 11 is a top plan view of a ring structure having a split in its sidewall.

FIG. 12 is a side elevation view, with parts broken away, of the multiple use container illustrating its use as a sprouter for seeds.

FIG. 13 is a side elevation view of two stacked ring structures with a portion broken away illustrating the use of clips which secure the ring structures together.

FIG. 14 is a side elevation view with portions broken away illustrating how the components of a utility bucket which are modified to form the multiple use container may be nested to form a compact configuration.

DETAILED DESCRIPTION OF THE INVENTION

The invention relates to a multiple use container which is particularly suited for use in the cultivation of plants. The container is preferably formed by simple modifications to a conventional, plastic, utility bucket and its associated lid; however, the components of the container may be manufactured specifically for this application.

Figure 4:
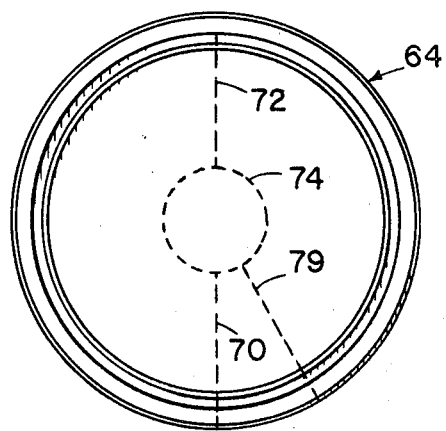
FIG. 4 is a top plan view of a lid for a bucket showing the modifications recommended to make a moisture retention lid for the multiple use container.
Figure 6:
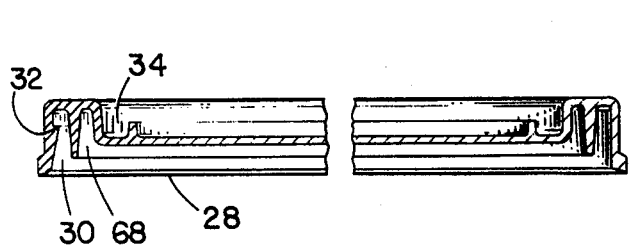
FIG. 6 is a partial section view of the lid of FIG. 3 illustrating on the left hand side the unmodified bucket lid and on the right hand side a modification to groove 30 to remove lip 32.
Figure 8:
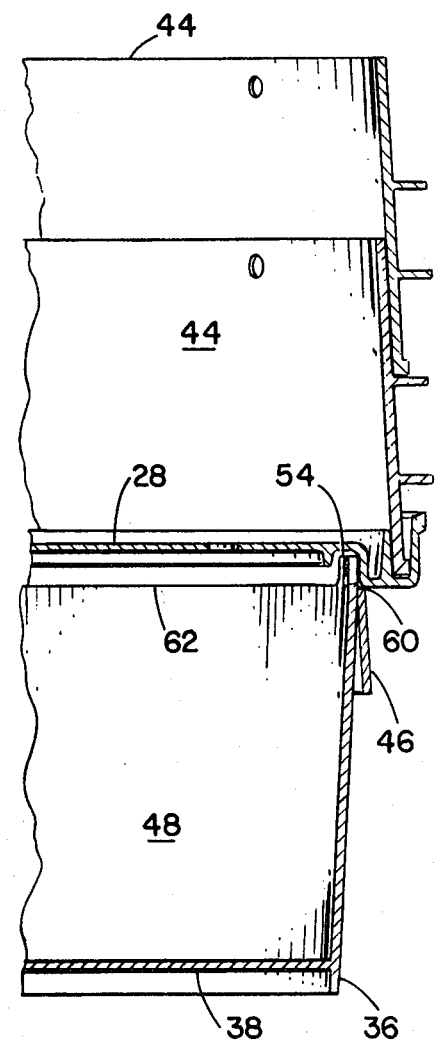
FIG. 8 is a partial section view of the multiple use container of FIG. 7 with the lid 64 removed.

The container 10 is preferably constructed from a plastic utility bucket of the general type shown in U.S. Pat. No. 3,474,928, R. S. Hurtt; U.S. Pat. No. 3,516,571, W. H. Roper et al.; and U.S. Pat. No. 3,515,306, W. H. Roper et al. The bucket portion 12 of such container characteristically has two or more circumferential, reinforcing ribs 14 and 16 on the upper portion of the bucket. Between an adjacent pair of the ribs is a pair of webs 18 and 20 each containing holes 22 and 24 respectively, shown in FIG. 10 which are utilized for receiving the ends of the bucket carrying handle. Normally one hole is circularly shaped and the other is of a vertically, oblong shape to facilitate the insertion of the handle. The bucket also has a projecting lip 26 about its upper rim. The buckets are characteristically provided with a lid 28 as shown in FIG. 4. The preferred lid construction is shown in cross section in FIG. 6. The lid is provided with a groove 30 having sidewalls which engage the lip 26 of the bucket. One sidewall is often provided with a locking lip 32 which engages the outer edge of the lip 26. The central portion of the lid has an annular groove or recess 34 which also has sidewalls. This annular recess is sized so as to receive the sidewall projection 36 which extends below the recessed bottom 38 of the bucket as shown in FIG. 8. The lower interior wall of the container projection 36 preferably engages the inner sidewall of the groove 34. This along with the taper of the bucket permits stacking of the containers.

Figure 1:
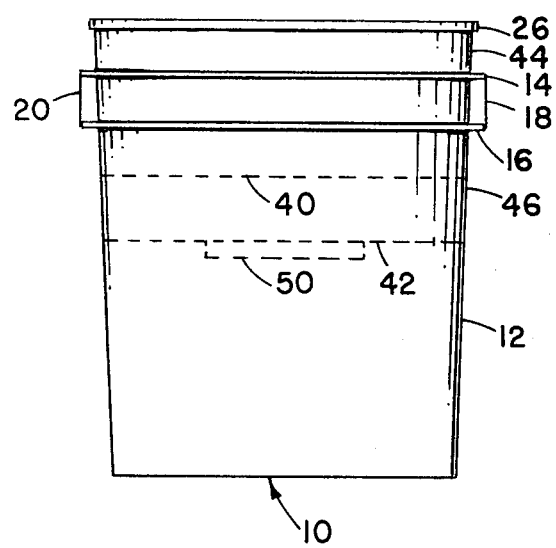
FIG. 1 is a side elevation view of a utility bucket from which the multiple use container may be constructed.

In order to construct the multiple use container the utility container is cut along the dotted lines 40 and 42 as shown in FIG. 1. One way these cuts may be made and the preferred way is by scoring the container with the sharp object along the line to be cut and thereafter cutting the container with a sharp blade. This forms three sections. The upper portion forms a ring structure 44 having upstanding sidewalls. The central portion forms a combined lifting and reinforcing ring 46 and the lower portion forms an open top container 48. An additional U-shaped cut is made along the line 50 and intersects line 42. Preferably there are three such cuts made at equally spaced locations around the rim 52 of the open top container 48 to form tabs 54. Preferably holes 56 are provided in each of the tabs 54. The holes 56 on the tabs 54 are provided so that the open top container may be used alone as a hanging plant container with the container suspended by ropes or the like passing through the holes 56.

Figure 3:
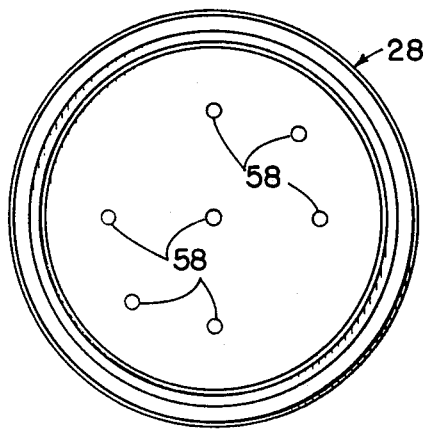
FIG. 3 is a top plan view of a bucket lid modified to form a combined lid and bottom structure for the multiple use container.

One of the bucket lids is modified as shown in FIG. 3. Holes 58 are placed in the lid. There may be one central hole or a series of holes as shown in FIG. 3. Holes approximately ⅜ inch in diameter are preferred. Preferably this lid is also modified as shown in the right hand side of FIG. 6 by routing the groove 30 to remove the locking lip 32.

Figure 5:
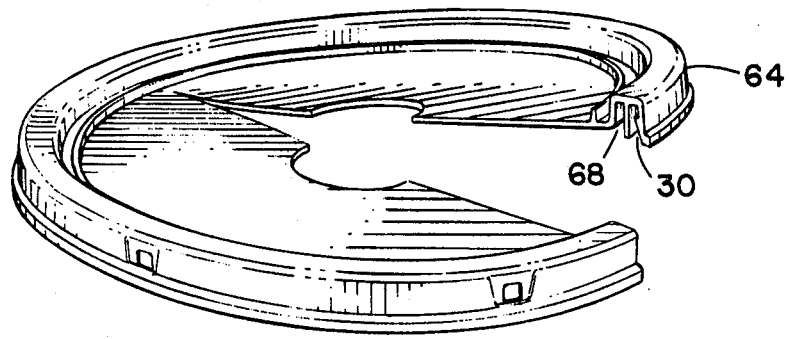
FIG. 5 is a perspective view of the moisture retention lid of FIG. 4 illustrating how the lid is flexed to allow insertion of the lid around the stem of a plant.
Figure 7:
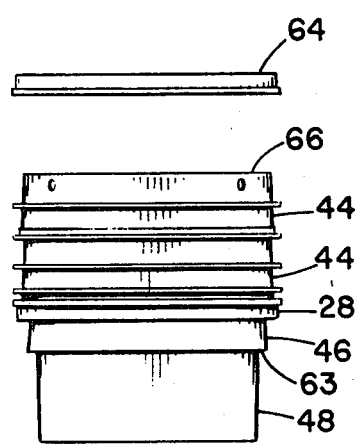
FIG. 7 is a side elevation view of the multiple use container.
Figure 9:
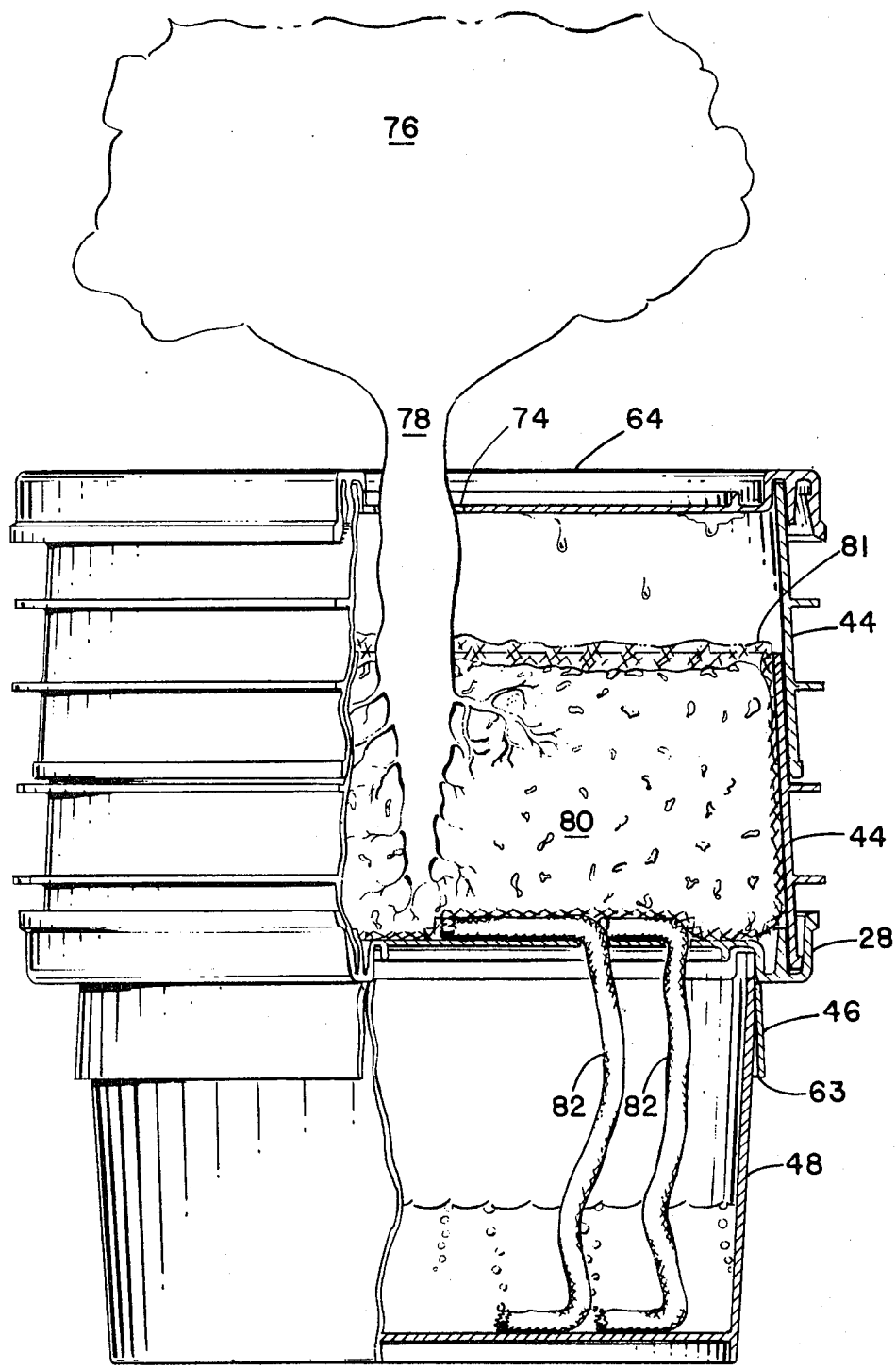
FIG. 9 is a side elevation view of the multiple use container of FIG. 7 illustrating its use with a plant and with portions broken away.

In the preferred form of the multiple use container the components described above are assembled as shown in FIG. 8 except that an additional ring 44 is shown in position. The reinforcing ring 46 is inverted and slid up the exterior of the open top container until its uppermost edge 60 is even with the base of the cutout 62 which forms the tabs 54. The reinforcing ring 46 allows the plant container and reservoir to be lifted together by lifting on the under edge 63 of the ring. The modified lid structure 28 shown in FIG. 3 is inverted and inserted over the tabs 54 and the open top container 48 so that the tabs are received in groove 34 of the lid. The flexible tabs 54 may be bent inward as necessary to insert them in groove 34. Preferably an interference fit serves to secure the lid to the top of the open top container with the outer wall of container 48 engaging the outer sidewall of groove 34. The depth of the groove 34 is coordinated with the depth of the cutouts 50 which forms the tabs 54 so that the open top container will be sealed by the inverted lid. The cutouts 50 may be of a greater depth than the depth of the groove if ventilation of the reservoir is required such as where the roots of the plant are allowed to grow through holes 58 and extend into the water. The ring structure 44 is then inverted and its rim 26 inserted within groove 30 of the modified lid 28. Preferably an additional lid 64 is placed on the top and encloses the container. The taper of the container and the lid structure is coordinated so that edge 66 of the ring structure is received within the sidewalls of groove 68 in the lid 64. Preferably this lid is also cut along a line 70 and 72 to form a split which communicates with the central hole 74. The resiliency of the plastic material from which the container is preferably made permits the lid to be then sprung as shown in FIG. 5 so that this lid may be inserted on the container while it contains a plant 76 as shown in FIG. 9 with the stem of the plant 78 passing through the hole 74 in the lid 64. As an alternative the lid may be cut on line 79 rather than line 72 to form a wider split in the moisture retention lid through which the stem may pass without the need for deforming the lid. Due to the tapering of the wall of the ring structure 44 a series of two or more of the ring structures may be stacked as shown in FIGS. 7 and 8.

In use as a plant cultivation container the lower, open top container is filled with water and used as a reservoir. The plant is planted in soil 80 in the upper portion of the container formed by one or more reinforcing rings 44 and the lid 28. Preferably the lower ring and the bottom of the container formed by lid 28 is lined with a mesh material 81 of nylon or the like. This mesh material may be held in position by the soil. A particular advantage of this nylon mesh is that the mesh serves to promote root distribution. When it is removed when the plant is being transplanted it takes with its portions of the roots which are intertwined in the mesh to effect a type of root shaving which can stimulate plant growth. The mesh also helps hold the plant's root ball together so that the plant may be transplanted without having to wait for the soil to dry out and helps keep soil from falling through holes 58. In addition wicks 82, preferably in the form of nylon rope, pass through holes 58 and extend into the water reservoir. The upper end of the wick is coiled in the bottom of the ring structure beneath the mesh and on top of the central surface of the lid 28. The lower end of the wick, which should now be longer than the depth of the reservoir, is coiled on the bottom of the reservoir 48. Preferably the rope is from one-quarter inch to five-sixteenth inch in diameter but the size is not critical. A single rope is often sufficient but more may be provided as desired. In lieu of using wicks or in additin to the wicks additional holes may be provided in the lid 28 so that the roots of the plant may grow through them into the water reservoir. In this form of operation a type of hydroponic growing can be effected which is a combination of soil and hydroponic growth. In this mode of use, the roots are permitted to extend by growth through the holes 58 and into the water in the reservoir. The roots will tend to grow down the wicks as well as through holes not containing wicks. Preferably there are more holes than there are wicks to permit both types of extension into the water to occur. If the holes 58 are used to permit the wicks to extend into the reservoir preferably the holes are at least two inches from the walls of the container to encourage the root growth to stay away from the reservoir wall.

When two or more ring structures 44 are stacked as shown in FIGS. 10 and 12, clips 86 may be provided to secure the ring structures together. The clips preferably consist of resilient wire segments having projecting ends which fit into the holes 22 and 24 of adjacent ring structures. Preferably, the ends 88 of the clips are bent slightly towards each other to help maintain the clips securely in place. When the clips are used, the ring structures are preferably aligned so that the circular shaped hole structure 22 is in line with the oblong hole structure 24 of the adjacent ring as shown in FIG. 10. This permits the use of clips of a single size.

As shown in FIG. 11, the ring structure may be split at 90 so that they may be opened so they may be added or removed to the top of other rings without having to be forced over plant foliage which may be substantially larger in diameter than the ring structure. The nesting of the rings serves to hold the split ring together in use when the splits in adjacent rings are staggered. The split also permits the rings to be nested around each other for storage or shipping.

The mesh material may be inserted as shown in FIGS. 10 and 12 so that it forms a level support surface. In this arrangement, as shown in FIG. 12, the container may be used as a sprouter for seeds 92. When used in this manner, water is placed in the reservoir 48 and a solid lid 94, which is preferably translucent, is placed on the top of the container. The container is exposed to sunlight or a heat source such as a light bulb placed above the container. This causes the water 96 to evaporate, passing through the holes 58 in the modified lid 28 and to condense on the undersurface of lid 94. The water then condenses and rains down on the seeds 92 supported on the mesh and thereafter returns to the reservoir 48.

FIG. 14 shows how the components from a single bucket after being modified may be nested to form a compact storage or shipping configuration.

The ring structure 44 may alone be placed around plants planted outdoors for use as a slug barrier and to limit the outward distribution of water and nutrients applied around the base of the plant.

When the ring structure is used with the container structure shown in FIG. 7, the lowest ring portion of a multiple ring arrangement may be removed and the roots of the plant shaved to promote growth. Thereafter, the lowest ring may be re-established in its proper position with a fresh supply of soil. Additional rings containing fresh soil may be added in a similar manner to allow the roots to expand downward. Also, the plant may be transplanted outdoors by simply removing the bottom enclosing cover 28 and setting the plant on the garden soil surface permitting the roots to grow downward.

Additional ring structures 44 may be added above the soil level to surround the plant and receive a lid which will enclose the plant and its container for shipping of the plant. This configuration may also be used with an opaque lid to shorten the daylight hours of a single plant. It also may be used to isolate a diseased plant from other neighboring plants and as a frost preventor.

The configuration like that shown in FIG. 12 but with the mesh removed may be used as an incubator for small plants placed in a separate small container and supported on the lid structure 28.

Figure 2:
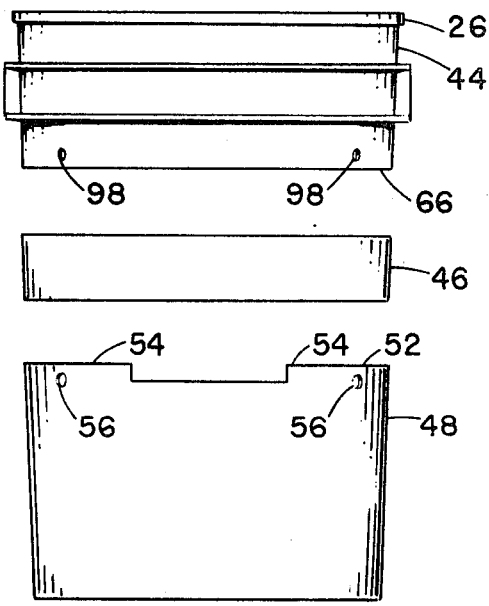
FIG. 2 is an exploded view of the bucket of FIG. 1 showing how the bucket is modified to make the container.

Three or more holes 98, as shown in FIG. 2, may be placed in the walls of ring structure 44 so that it may be used with a non-perforated lid as a suspended plant container with support wires or ropes fastened through holes 98.

A single ring 44 filed with soil and with lids 28 on the top and bottom may be used as a seed germinator.

I claim:

1. A method of making a multiple use container, adapted for growing plants, sprouting seeds or the, like, from utility pails and mateing lids comprising the steps of:
   (a) selecting a circular utility bucket of the type having tapered side walls and an enclosing bottom;
   (b) selecting a lid which has a circumferential, circular groove on its bottom surface mateable with the top edge of the bucket and a circumferential, circular groove on its top of a smaller diameter than that on its bottom surface;
   (c) cutting the bucket on a transverse plane to form a ring structure to which the lid may be attached and the entire ring and lid inverted and to form an open top container whose top will receivably engage the groove in the top of the lid which when inverted forms a lid for the open top container.

2. A method of making a multiple use container from utility pails and mateing lids, as claimed in claim 1, comprising the additional steps of cutting the open top container at spaced intervals along its top to form a plurality of tabs and cutting the bucket on a second transverse plane above the plane of the cut defining the top of the open top container to form a ring which may be inverted and placed around the top of the open top container to reinforce the tabs and provide a grip for lifting the container.

3. A method of making a multiple use container from utility pails and mateing lids; as claimed in claim 1, further comprising the step of perforating the interior surface of the lid.

4. A method of making a multiple use container from utility pails and mateing lids, as claimed in claim 1, wherein the step of selecting a bucket includes selecting a bucket of the type having at least one circumferential rib on the upper, exterior portion of the bucket and wherein the step of cutting the bucket to form the ring structure includes cutting the bucket below the rib so that the rib is on the ring structure; and further comprising the steps of selecting a second bucket identical to the first and then cutting the second bucket on a transverse plane to form a second ring structure with a rib which may be inverted to nest with the first ring structure to increase the height of the multiple use container.

5. A multiple use container comprising:
   (a) an open top circular container having a bottom and tapered side walls bounded by a top edge and a bottom edge wherein the top of the container is larger in diameter than at the bottom edge of the container;
   (b) a circular ring structure having an open top, an open bottom, tapered upstanding sidewalls bounded by a top edge and bottom edge with the bottom edge of the ring structure having a larger diameter than both its top edge and the top of the open top container; and
   (c) a combined lid for the open top container and bottom for the ring structure, having a perforated, planar central surface, a bottom which receivably engages the top of the open top container and a top surface which receivably engages the bottom of ring structure.

6. A multiple use container, as claimed in claim 5, wherein there are a plurality of identical tapered wall ring structures each having a projection extending from their wall which engage the bottom edge of an adjacent ring for support when they are stacked:

7. A multiple use container, as claimed in claim 5, wherein the walls of the open top container are tapered and extend beyond the bottom of the container on the outside to form a circumferential projection and wherein the combined lid and bottom structure has a circumferential groove on its bottom defined by an outer wall which engages at least a portion of the top of the open top container and an inner circumferential wall which is engageable with the projection on the bottom of the open top container to restrict its lateral movement when the combined lid and bottom structure is inverted and the open top container is stacked on the combined lid and bottom structure.

8. A multiple use container, as claimed in claim 7, comprising in addition, a lid for enclosing the top of the ring structure.

9. A multiple use container, as claimed in claim 8, wherein the lid has a top surface defining a central hole therein and a split which communicates with the hole and the edge of the lid to permit the stem of a plant in the ring structure to pass through the hole in the lid with the split permitting the lid to be inserted and removed.

10. A multiple use container, as claimed in claim 5, wherein the open top container and the ring structure are uniformly tapered at the same angle with respect to their respective top and bottom edges and the diameter of the top edge of the ring structure does not exceed the diameter of the top of the open top container.

11. A multiple use container, as claimed in claim 10, wherein the top of the open top container has a plurality of upstanding tabs which engage the bottom of the lid forming open spaces between the tabs for the entry of air in to the open top container when the lid is in place.

12. A multiple use container, as claimed in claim 11, further comprising a circular band of a resilient material which is uniformly tapered with respect to its top and bottom edge at the same angle as the open top container, with the bottom edge larger in diameter than the top edge, and the ring structure has its top edge the same diameter as the top of the open top container and surrounds the upper parts of the open top container, below the tabs to reinforce the top of the open top container and to provide a grip for lifting the container.

13. A multiple use container, as claimed in claim 12, wherein the top edge of the ring structure and the bottom edge of the circular band are the same diameter.

* * * * *